(12) United States Patent
Kuhns

(10) Patent No.: US 7,958,695 B2
(45) Date of Patent: Jun. 14, 2011

(54) METHOD AND APPARATUS FOR USE WITH A GROUP OF BALES

(76) Inventor: Kenneth Kuhns, North Bloomfield, OH (US)

( * ) Notice: Subject to any disclaimer, the term of this patent is extended or adjusted under 35 U.S.C. 154(b) by 107 days.

(21) Appl. No.: 12/422,550

(22) Filed: Apr. 13, 2009

(65) Prior Publication Data

US 2010/0257817 A1    Oct. 14, 2010

(51) Int. Cl.
*B65B 13/02* (2006.01)
(52) U.S. Cl. .............................. 53/399; 53/438; 53/540
(58) Field of Classification Search .................... 53/399, 53/438, 447, 449, 439, 529, 530, 540, 541, 53/176
See application file for complete search history.

(56) References Cited

U.S. PATENT DOCUMENTS

| | | | |
|---|---|---|---|
| 2,734,646 A * | 2/1956 | Stimpson | 414/732 |
| 3,099,203 A * | 7/1963 | Klemm et al. | 100/19 R |
| 3,420,564 A | 1/1969 | Jensen | |
| 3,430,783 A | 3/1969 | Butler | |
| 3,563,162 A | 2/1971 | Monroe | |
| 3,615,112 A * | 10/1971 | Minke | 289/13 |
| 3,726,210 A | 4/1973 | Hawkins | |
| 3,876,093 A | 4/1975 | Carriere | |
| 4,074,623 A * | 2/1978 | White | 100/3 |
| 4,142,746 A * | 3/1979 | White | 289/2 |
| 4,157,063 A | 6/1979 | Minke | |
| 4,765,235 A * | 8/1988 | Schrag et al. | 100/3 |
| 5,090,177 A * | 2/1992 | Gombos et al. | 53/399 |
| 5,695,311 A * | 12/1997 | Miguel et al. | 414/802 |
| 6,655,266 B2 | 12/2003 | Brown, Jr. | |
| 7,080,494 B2 | 7/2006 | Toews | |
| 7,296,828 B2 * | 11/2007 | Schoonheere et al. | 289/2 |

* cited by examiner

Primary Examiner — Sameh H. Tawfik
(74) Attorney, Agent, or Firm — Tarolli, Sundheim, Covell & Tummino LLP

(57) ABSTRACT

An improved method and apparatus is used with a group of bales. The group of bales is gripped with a bale handling apparatus. A flexible strip is positioned around the group of bales. The group of bales is then moved while the group of bales is gripped by the bale handling apparatus and while the flexible strip extends around the group of bales. The flexible strip is positioned relative to the group of bales by a positioning member which is connected with the bale handling apparatus.

48 Claims, 7 Drawing Sheets

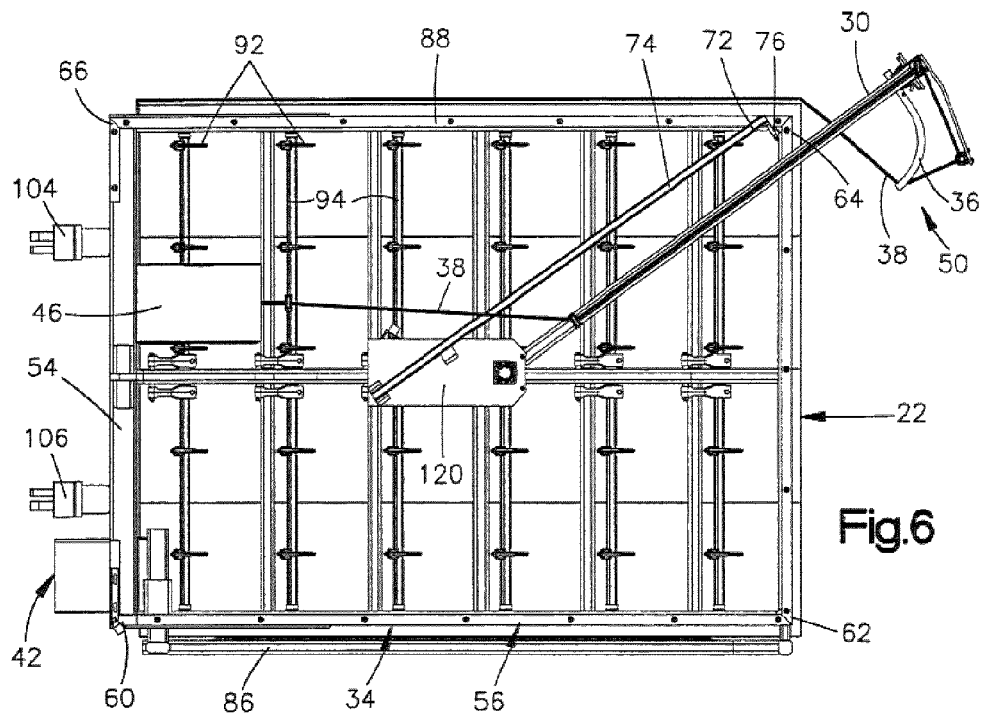
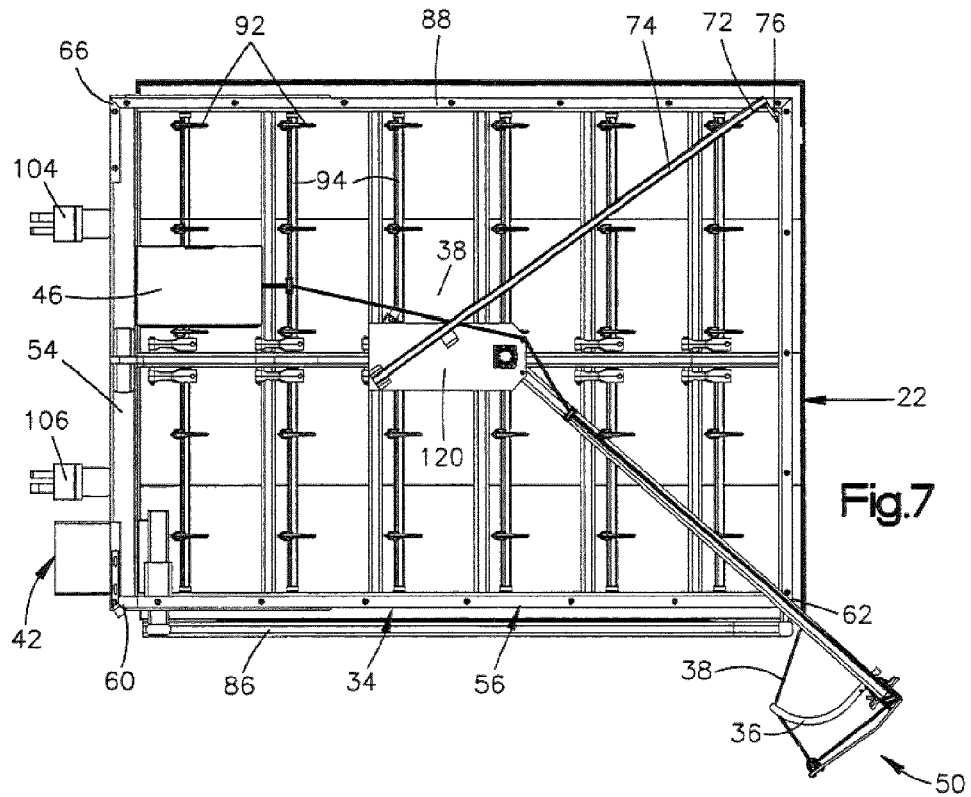

METHOD AND APPARATUS FOR USE WITH A GROUP OF BALES

BACKGROUND OF THE INVENTION

The present invention relates to a new and improved method and apparatus for use with a group of bales.

After a crop stock has been cut, the crop stock is collected and formed into bales to facilitate subsequent handling. The crop stock may be hay, alfalfa, oats, straw, soybeans, or other crops. An apparatus for use in forming a group of bales of a crop stock is disclosed in U.S. Pat. No. 7,275,904. Of course, a group of bales may be formed in a manner other than by using the apparatus disclosed in the aforementioned U.S. patent.

SUMMARY OF THE INVENTION

The present invention relates to a new and improved method and apparatus for use with a group of bales. The group of bales is gripped with a bale handling apparatus. A flexible strip is positioned around the group of bales. The group of bales is moved while it is gripped by the bale handling apparatus and while the flexible strip extends around the group of bales.

To position the flexible strip around the group of bales, a positioning member may advantageously be moved relative to the bale handling apparatus while the positioning member is in engagement with the flexible strip and while the bale handling apparatus is in engagement with the group of bales. The flexible strip may be formed into a closed loop which extends around the group of bales by interconnecting portions of the flexible strip.

The present invention has a plurality of different features. These features may be utilized in combination with each other in the manner disclosed herein. Alternatively, the features may be used separately and/or in combination with features of known devices.

BRIEF DESCRIPTION OF THE DRAWINGS

The foregoing and other features of the present invention will become more apparent upon a consideration of the following description taken in connection with the accompanying drawings wherein:

FIG. 6 is a schematic top plan view, generally similar to FIG. 5, illustrating the flexible strip positioning apparatus in a position in which the flexible strip has been positioned along one side of the group of bales by movement of a support member or arm from the position illustrated in FIG. 5 to the position illustrated in FIG. 6;

FIG. 7 is a schematic top plan view, generally similar to FIGS. 5 and 6, illustrating the positioning member in a position in which the flexible strip has been positioned along another side the group of bales;

DESCRIPTION OF SPECIFIC PREFERRED EMBODIMENTS OF THE INVENTION

General Description

An apparatus 20 (FIGS. 1-4), constructed and operated in accordance with the present invention, is utilized with a group 22 of bales 24 of a crop stock which may be hay, alfalfa, oats, straw, soybeans, or other crops. The group 22 of bales is formed in a field by the use of a bale accumulator having a construction generally similar to the construction disclosed in U.S. Pat. No. 7,275,904. Of course, a group 22 of bales may be formed in a different manner. For example, the bales may be positioned in the group 22 one at a time. Alternatively, a bale accumulator having the construction similar to the construction disclosed in U.S. Pat. Nos. 4,053,064 or 4,051,964 may be utilized to form the group 22 of bales.

Each of the bales 24 is formed of a compressed crop stock and has a rectangular configuration. However, each bale 24 may have a different configuration if desired. One or more flexible strips, such as binder twine, wires, and/or bands, extend around each bale 24 to maintain the rectangular configuration of the bale of compressed crop stock. The bales 24 may be formed using any one of many known balers.

The illustrated group 22 of bales includes fifteen rectangular bales 24. However, a greater or lesser number of bales 24 may be provided in the group 22. For example, the group 22 of bales may include between eight and eighteen bales. However, it should be understood that the group 22 may consist of any desired number of bales.

Figure 1:
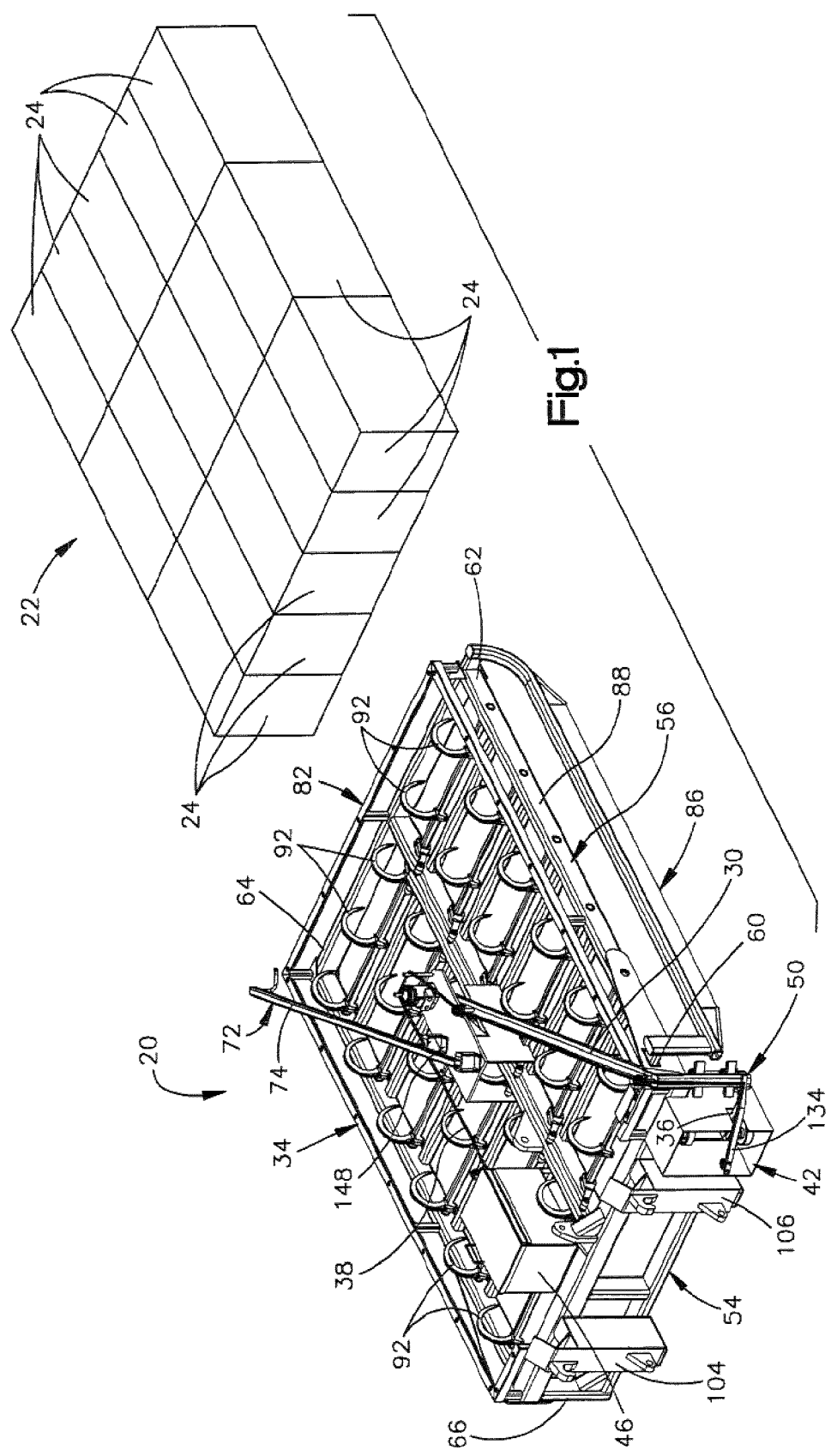
FIG. 1 is a schematic pictorial illustration depicting a relationship of an apparatus constructed and operated in accordance with the present invention to a group of bales prior to positioning of a portion of a flexible strip in an initial position relative to a bale handling apparatus.

In the illustrated embodiment of FIG. 1, the group 22 of bales has a polygonal configuration, specifically, a rectangular configuration. However, it is contemplated that the group 22 of bales may have a different configuration if desired. For example, the group 22 of bales may have a generally hexagonal configuration, or a generally triangular configuration, or a generally circular configuration.

When a group 22 of bales is to be handled with the apparatus 20, a support member or arm 30 is pivoted in a counterclockwise direction (as viewed in FIG. 1) relative to a bale handling apparatus 34 while the bale handling apparatus is supported above a field by a vehicle. The vehicle may be a tractor having a boom which is connected with the bale handling apparatus 34.

A needle or positioning member 36 is pivotally mounted on a radially outer end portion of the support member or arm 30. The support member or arm 30 is pivotally mounted on the bale handling apparatus 34. Counterclockwise pivotal movement of the support member or arm 30 moves the needle or positioning member 36 connected with a flexible strip 38 away from a connector apparatus 42. One end, that is, a free end, of the flexible strip 38 is gripped by the connector apparatus 42. The opposite end of the flexible strip 38 is disposed on a supply spool or bobbin in a source 46 of the flexible strip.

The flexible strip 38 extends from the source 46 along the support arm or member 30 to the needle or positioning member 36. The needle or positioning member 36 is pivotally mounted on a radially outer end portion of the arm 30. The flexible strip 38 extends through an opening in an outer end portion of the needle or positioning member 36 to the connector apparatus 42. As was previously mentioned, one end of the flexible strip 38 is held by the connector apparatus 42.

The flexible strip 38, in one embodiment of the invention, is a string or twine, such as binder twine. However, the flexible strip 38 may be a rope, cord, or wire. Alternatively, the flexible strip 38 may be formed as a strap or band. The flexible strip 38 may be formed of a synthetic and/or natural material.

While the group 22 of bales is disposed in a field and while the apparatus 20 is spaced from the group of bales, in the manner illustrated schematically in FIG. 1, a flexible strip positioning apparatus 50 is operated to position a length of the flexible strip 38 along a rear portion or end section 54 of a frame 56 of the bale handling apparatus 34. To accomplish this, the support member or arm 30 of the flexible strip positioning apparatus 50 is pivoted, in a counterclockwise direction, from the position shown in FIG. 1, through the position shown in FIG. 2, to the position shown in FIG. 3. The bale handling apparatus 34 may be connected with a suitable vehicle (not shown in FIGS. 1-4) to support the bale handling apparatus above the field and to move the bale handling apparatus relative to the field.

As the arm 30 is pivoted, the arm 30 moves counterclockwise (as viewed in FIG. 1) from a position in which it extends over a right rear corner portion 60 of the bale handling apparatus 34. As the arm 30 continues to pivot, it moves through a position in which the arm 30 extends over a right front corner portion 62 of the bale handling apparatus 34. The flexible strip or string 38 is pulled from the source 46 as the needle or positioning member 36 moves away from the source toward the right front corner portion 62. As this occurs, the free end of the flexible strip 38 is held by the connector apparatus 42. The flexible strip 38 slides through an opening in the end portion of the needle or positioning member 36 and is tensioned as the support arm 30 pivots relative to the bale handling apparatus 34.

Continued counterclockwise (as viewed in FIGS. 1 and 2) pivotal movement of the support arm 30 moves the positioning member 36 to a location adjacent to a left (as viewed in FIG. 1) front corner portion 64 of the frame 56 of the bale handling apparatus 34. As the support arm 30 continues to pivot in a counterclockwise direction relative to the bale handling apparatus 34, the needle or positioning member 36 (FIG. 2) moves past the left front corner portion 64 toward a left (as viewed in FIG. 1) rear corner portion 66 of the bale handling apparatus frame 56. As this occurs, the needle or positioning member 36 moves toward the source 46 of the flexible strip 38 and slack is formed in the flexible strip.

Figure 2:
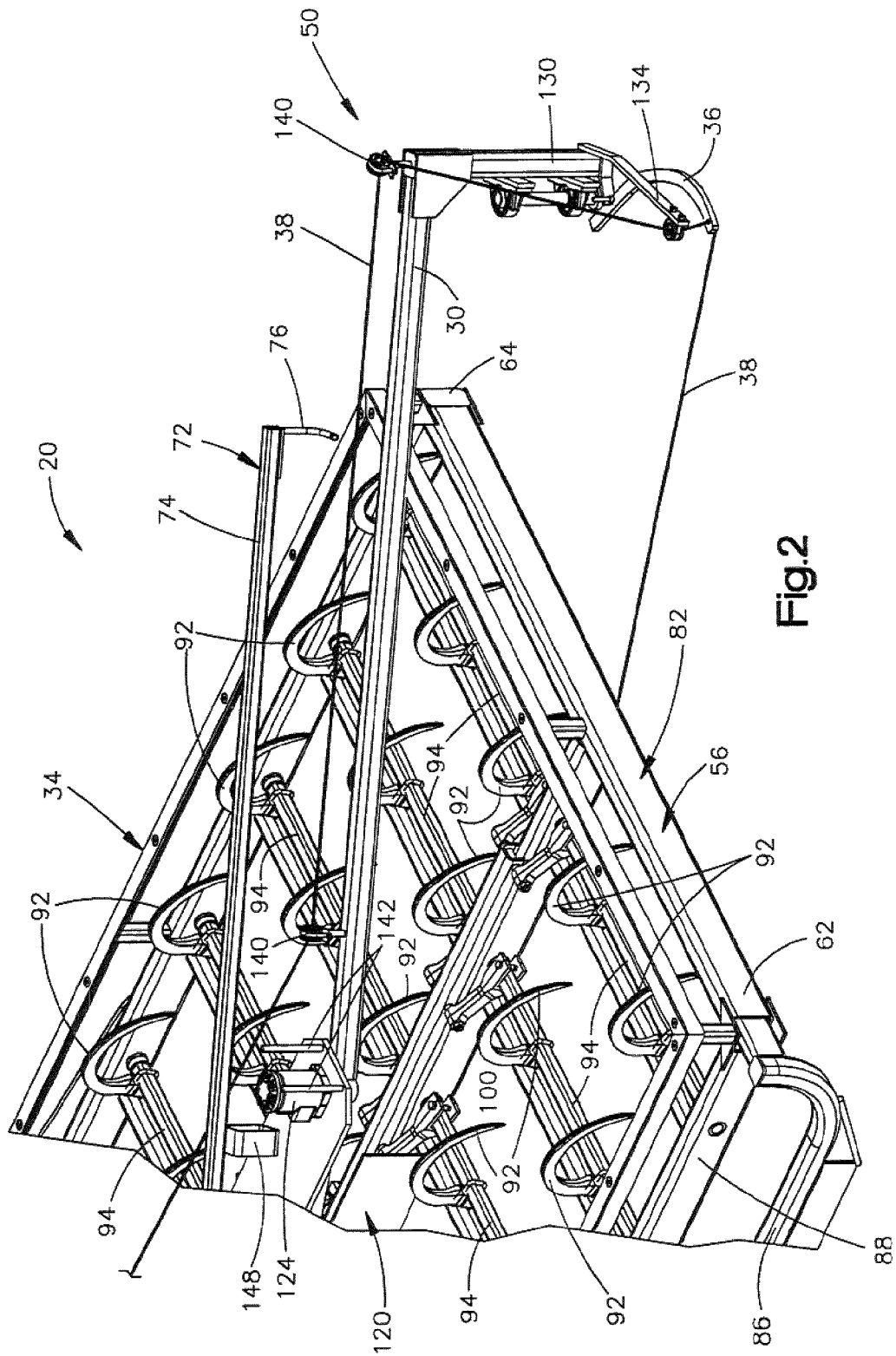
FIG. 2 is an enlarged fragmentary schematic illustration, of a portion of the apparatus of FIG. 1, depicting the manner in which a portion of the flexible strip is engaged by a slack take-up device as the flexible strip is moved toward the initial position relative to the bale handling apparatus.

A slack take-up device 72 is mounted on the bale handling apparatus 34 and takes-up the slack which forms in the flexible strip 38 as the needle or positioning member 36 moves toward the left rear corner portion 66 of the frame 56 and toward the source 46 of the flexible strip 38. The slack take-up device 72 includes an arm 74 (FIGS. 1 and 2) which is mounted on the frame 56. A hook 76 (FIG. 2) extends downward from the arm 74 into the path of movement of a portion of the flexible strip 38 which extends along the arm 30 of the positioning apparatus 50. As the support arm 30 of the flexible strip positioning apparatus 50 continues to move in a counterclockwise direction (as viewed in FIGS. 1 and 2), the portion of the flexible strip 38 which extends along the upper side of the support arm 30 moves into engagement with the hook 76 (FIG. 2).

As the support arm 30 of the flexible strip positioning apparatus 50 continues to pivot in a counterclockwise direction (as viewed in FIG. 2), the support arm 30 moves away from the left front corner portion 64 and the hook 76 on the arm 74 of the slack take-up device 72. As this occurs, the positioning member 36 moves toward the source 46 of the flexible strip 38 and slack is formed in the flexible strip. This slack is taken up by engagement of the flexible strip 38 with the hook 76. Thus, slack formed in the flexible strip 38 as the positioning member or needle 36 moves toward the source 46 of the flexible strip is supported by the hook 76 and does not become tangled in the bale handling apparatus 34.

Figure 3:
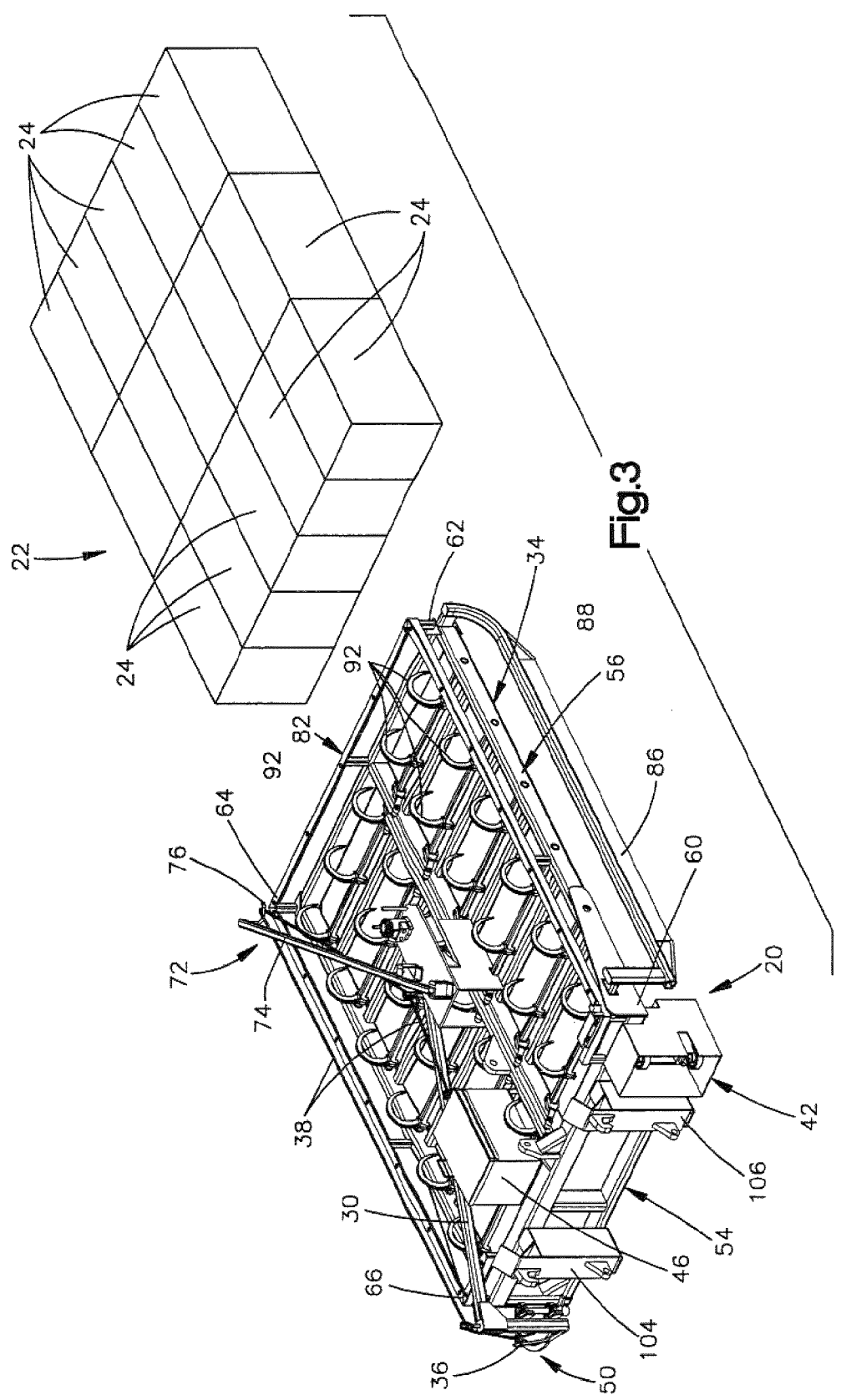
FIG. 3 is a schematic pictorial illustration, generally similar to FIG. 1, illustrating the relationship of a flexible strip positioning apparatus relative to the bale handling apparatus when a portion of the flexible strip has been moved to the initial position relative to the bale handling apparatus and prior to engagement of the bale handling apparatus with the group of bales.

Once a length of the flexible strip 38 has been positioned along the rear end section 54 of the frame 56, rotation of the support arm 30 in the flexible strip positioning apparatus 50 is interrupted with the positioning member 36 in the position illustrated in FIG. 3. At this time, the free end of the flexible strip or string 38 is held by the connector apparatus 42. The flexible strip 38 extends leftward (as viewed in FIG. 3) from the connector apparatus 42 to an opening in the end portion of the needle or positioning member 36. This results in the flexible strip 38 being tensioned and extending across the rear end section 54 of the frame 56. At this time, the length of the flexible strip 38 which extends from the connector apparatus 42 to the positioning member 36 is slightly offset from the rear end section 54 of the frame 56 toward a front end portion 82 of the frame 56.

Figure 4:
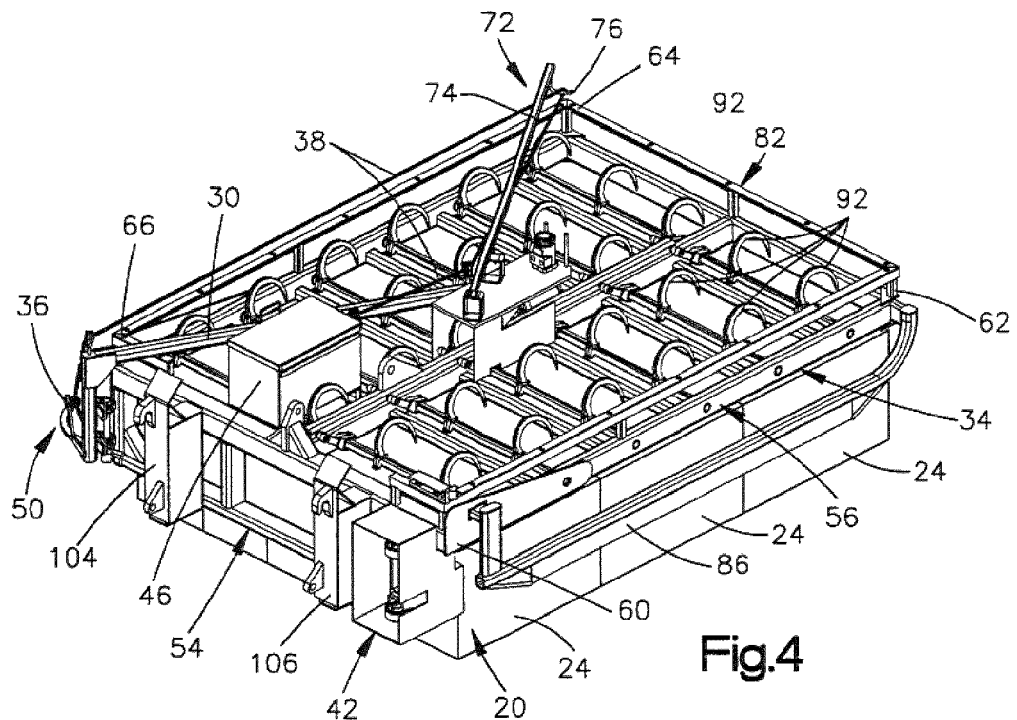
FIG. 4 is a schematic illustration, generally similar to FIGS. 1 and 3, depicting the bale handling apparatus in engagement with the group of bales.

Once a length of the flexible strip or string 38 has been positioned along the rear end section 54 of the bale handling apparatus 34, the bale handling apparatus 34 is moved from a position spaced from the group 22 of bales 24, that is, from the position illustrated in FIGS. 1 and 3, to a position in which the bale handling apparatus 34 is disposed in engagement with the group 22 of bales, in the manner illustrated schematically in FIG. 4. As this occurs, the bale handling apparatus 34 is supported above the field and moved rightward (as viewed in FIG. 1) by a vehicle toward the group 22 of bales with the front end portion 82 leading and the rear end section 54 trailing. As the bale handling apparatus 34 approaches the stationary group 22 of bales, a side section 86 of a bale handling apparatus 34 is aligned with and slides along the right (as viewed in FIGS. 1 and 3) side of the group 22 of bales. At this time, a main or base portion 88 of the frame 56 is disposed slightly above an upper side of the group 22 of bales.

Continued movement of the bale handling apparatus 34 by the vehicle in a direction toward the group 22 of bales moves the rear end section 54 of the frame 56 toward the left (as viewed in FIGS. 1 and 3) end of the group 22 of bales. As this occurs, the length of the flexible strip 38 disposed adjacent to and slightly ahead of the rear end section 54 moves into engagement with the left (as viewed in FIGS. 1 and 3) side of the group 22 of bales. Continued forward movement of the bale handling apparatus 34 presses the rear end section 54 of the frame 56 against the side of the group of bales. When this occurs, the base 88 of the bale handling apparatus 34 is lowered to rest on the top of the group 22 of bales (FIG. 4). At this time, the group 22 of bales is disposed in a field and supports the bale handling apparatus 34 at a level above the field.

Once the bale handling apparatus 34 has been positioned on top of the group of bales 22, the bale handling apparatus is operated to grip the group 22 of bales. Although the bale handling apparatus 34 may use any one of many different known devices to grip a group 22 of bales, in the illustrated embodiment of the bale handling apparatus, hooks 92 are provided to grip the bales 24. The hooks 92 are fixedly connected to rocker shafts 94 (FIG. 2) which extend between opposite sides of the frame 56.

The rocker shafts 94 are rotatable relative to the frame 56. A drive shaft 100 is connected with the rocker shafts and is movable in a forward direction toward the front end portion 82 of the frame to pivot the hooks 92 in a clockwise direction (as viewed in FIG. 2). As this happens, pointed end portions of the hooks 92 move downward into the bales 24. The drive shaft 100 is connected with a piston and cylinder type motor (not shown) which is operable to move the drive shaft 100 axially relative to the frame 56. Once the hooks 92 have been pivoted into engagement with the bales 24, the bales are firmly gripped and held against movement relative to each other and relative to the bale handling apparatus 34.

In the illustrated embodiment of the invention, the bale handling apparatus 34 grips the group 22 of bales by penetrating the bales 24 with hooks 82. However, the group 22 of bales may be gripped with a clamping action if desired. If this is done, the bale handling apparatus 34 may include a bale gripper which has a construction similar to the construction disclosed in U.S. Pat. No. 5,725,346 and/or the construction disclosed in U.S. Pat. No. 6,027,302. Of course, other types of bale grippers may be utilized if desired.

While the bale handling apparatus 34 is gripping the bales 24, the flexible strip positioning apparatus 50 is operated in the manner illustrated schematically in FIGS. 5, 6, 7 and 8 to position the flexible strip 38 along sides of the group 22 of bales at a location beneath the bale handling apparatus 34. The connector apparatus 42 is then operated to interconnect portions of the flexible strip 38 to form a closed loop which extends around the group 22 of bales. The closed loop, formed by the flexible strip 38, retards movement of the bales 24 relative to each other after the bale handling apparatus 34 has been disconnected from the group 22 of bales. This results in the bales 24 being maintained in the group 22 by the closed loop after the bale handling apparatus 34 has been disconnected from the bales.

Figure 5:
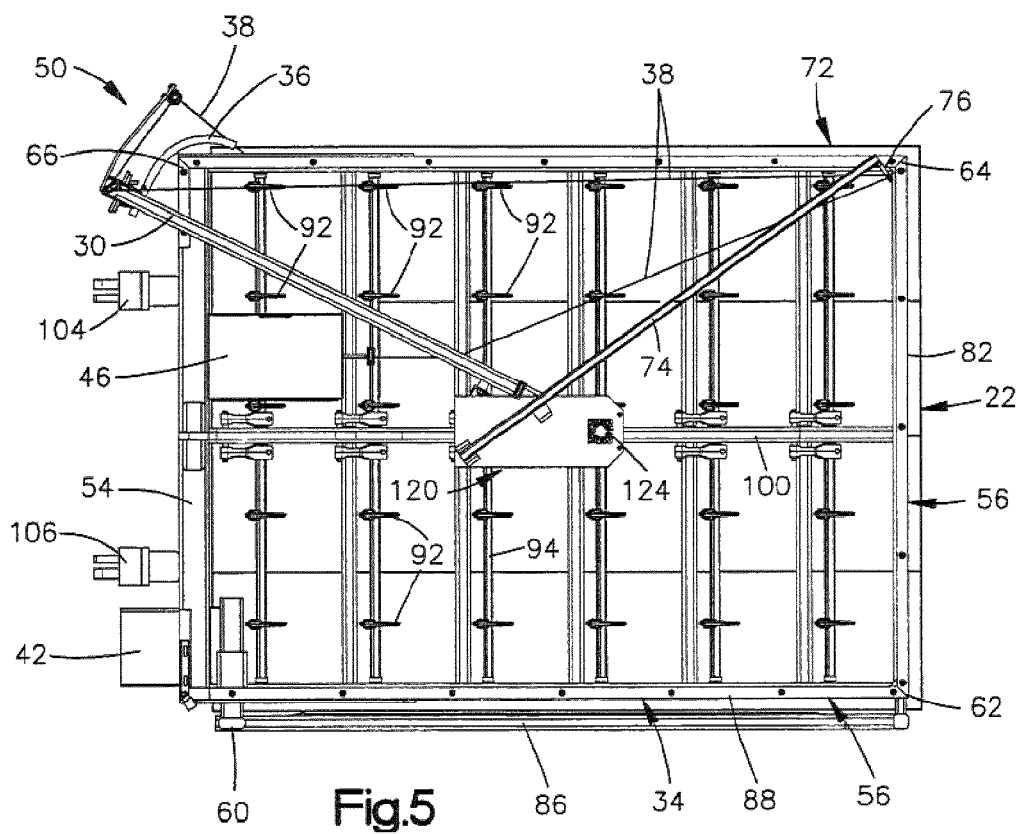
FIG. 5 is a schematic top plan view, taken generally along the line 5-5 of FIG. 4, illustrating the bale handling apparatus after it has gripped the group of bales.

To position the flexible strip 38 along the left (as viewed in FIG. 4) side of the group 22 of bales while the bale handling apparatus 34 is disposed on the group of bales, the flexible strip positioning apparatus 50 is operated from the condition illustrated in FIG. 5 to the condition illustrated in FIG. 6. As the flexible strip positioning apparatus 50 is operated from the condition illustrated in FIG. 5 to the condition illustrated in FIG. 6, the support arm 30 is pivoted in a clockwise direction relative to the bale handling apparatus 34. This clockwise (as viewed in FIGS. 5 and 6) pivotal movement of the arm 30 moves the needle or positioning member 36 along an arcuate path toward the left front corner portion 64 of the bale handling apparatus 34. The path along which the needle or positioning member 36 moves is disposed at a lower level than the bale handling apparatus 34.

As this occurs, the needle or positioning member 36 approaches the hook 76 and slack stored in the slack take-up device 72 is released. The released slack is pulled from the slack take-up device 72 by the positioning member 36 and positioned along the side of the group 22 of bales by the positioning member 36. As the positioning member 36 is moved past the left front corner portion 64 of the bale handling apparatus 34, the support arm 30 moves under the hook 76 and pulls the flexible strip 38 off of the hook. This results in the flexible strip 38 being disengaged from the slack take-up device 72.

Once the pivotal movement of the support arm 30 has moved the positioning member 36 past the left front corner portion 64 (FIG. 6), the positioning member pulls the flexible strip 38 along the right (as viewed in FIG. 6) side of the group 22 of bales. At this time, all of the flexible strip 38 which was previously held by the slack take-up device 72 will have been removed from the slack take-up device. As the support arm 30 continues to pivot in a clockwise direction (as viewed in FIG. 6) away from the left front corner portion 64, a portion of the flexible strip 38 will be pulled from the source 46 and moved along the arm 30 to the positioning member 36. As the support arm 30 pivots, the flexible strip 38 is pulled through the opening in the end portion of the needle or positioning member 36.

A portion of the flexible strip is positioned along the right (as viewed in FIG. 6) side of the group 22 of bales as the needle or positioning member 36 moves away from the left front corner portion 64 (FIG. 6) toward the right front corner portion 62. As this occurs, the arm 30 pivots toward the position shown schematically in FIG. 7. A length of the flexible strip 38 is placed along the right (as viewed in FIGS. 6 and 7) side of the group 22 of bales by the positioning member 36. The length of the flexible strip 38 positioned along the right side of the group 22 of bales is disposed midway between upper and lower sides of the group of bales.

Continued pivotal movement of the support arm 30 in a clockwise direction (as viewed in FIGS. 7 and 8) moves the needle or positioning member 36 away from the right front corner portion 62 (FIG. 7) toward the right rear corner portion 60. This movement of the positioning member 36 is effective to position a length of the flexible strip 38 along a side of the group 22 of bales at a location below, that is closer to the ground, than the bale handling apparatus 34.

Figure 8:
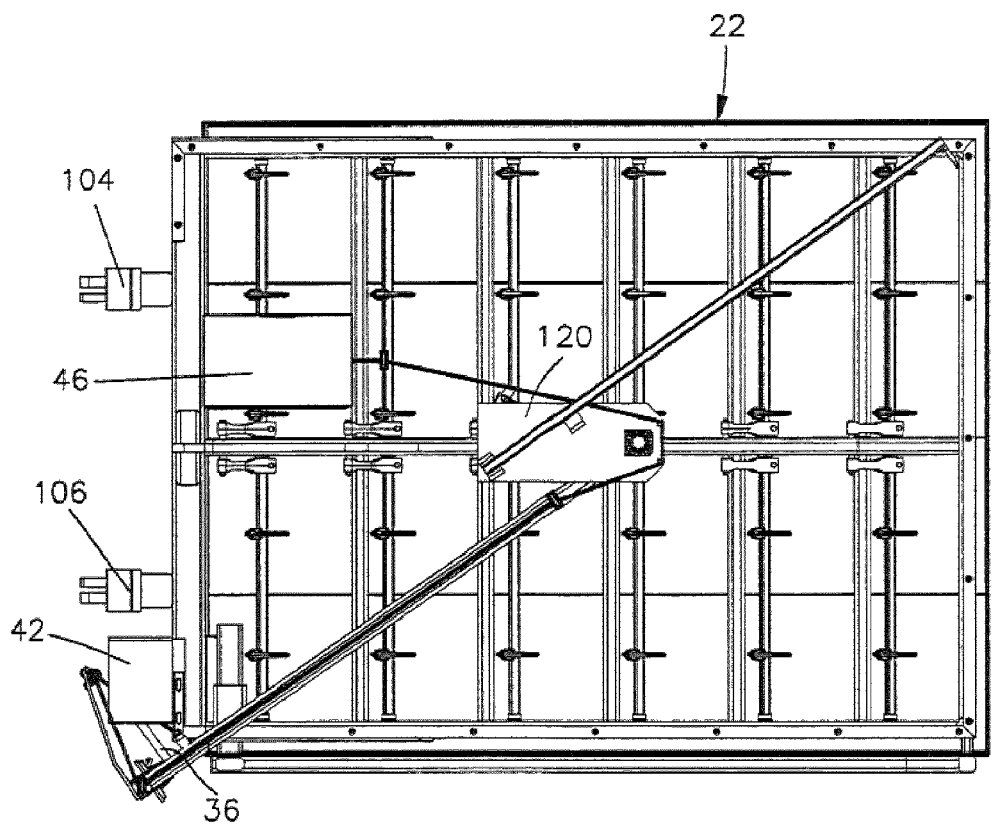
FIG. 8 is a schematic top plan view, generally similar to FIGS. 5-7, illustrating the support member after the flexible strip has been positioned along another side of the group of bales and after the flexible strip has formed a closed loop around the group of bales.

As the support arm 30 approaches the position illustrated in FIG. 8, the needle or positioning member 36 moves into the connector apparatus 42. After the needle or positioning member 36 has entered the connector apparatus 42, the flexible strip 38 is severed and the resulting free end of the flexible strip, that is the end extending from the positioning member 36, is gripped by the connector apparatus 42. In addition, the connector apparatus 42 interconnects portions of the flexible strip 38 to form a continuous loop which extends around the group 22 of bales.

The connector apparatus 42 may interconnect portions of the flexible strip 38 to form the continuous loop before cutting the flexible strip 38. The connector apparatus 42 would then cut the flexible strip to form the end which is gripped by the connector apparatus 42 and is separate from the continuous loop. Alternatively, the connector apparatus 42 may cut the flexible strip 38 and grip the resulting ends of the flexible strip. The connector apparatus 42 would then interconnect the free ends to the portion of the flexible strip 38 which extends around the group 22 of bales to form the continuous loop. The free end of the portion of the flexible strip 38 extending from the connector apparatus 42 toward the source 46 would be gripped by the connector apparatus.

Figure 9:
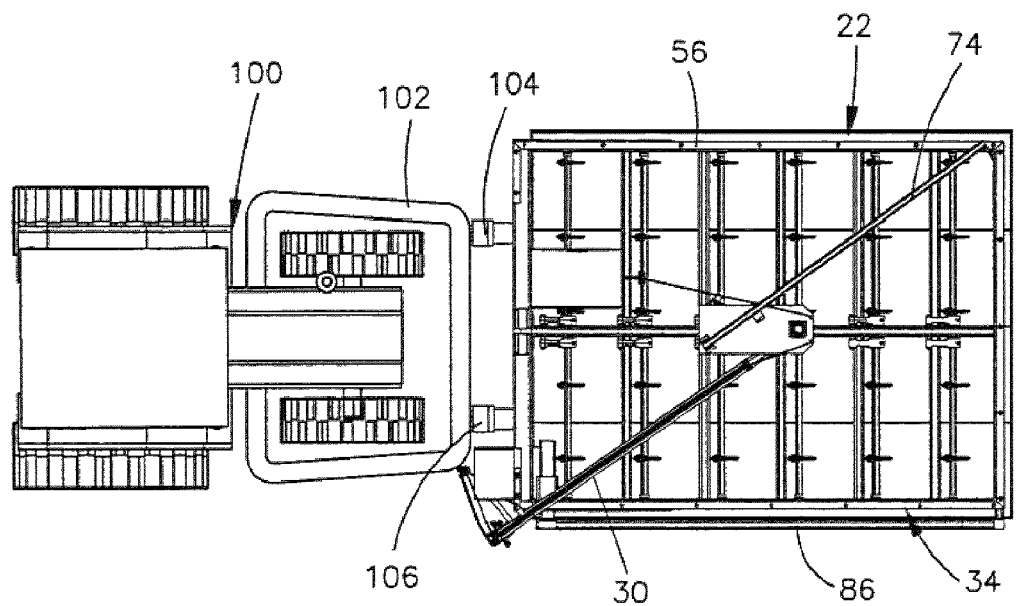
FIG. 9 is a schematic top plan view, similar to FIGS. 5-8, depicting the manner in which the bale handling apparatus and a group of bales are moved by a vehicle with the flexible strip extending around the group of bales.

The bale handling apparatus 34 is positioned on the group 22 of bales by a vehicle, such as a tractor 100 (FIG. 9). The tractor 100 has a boom 102 which engages connectors 104 and 106 extending from the frame 56 of the bale handling apparatus 34. The tractor 100 and boom 102 are utilized to support the bale handling apparatus 34 above the field. The tractor 100 is operated to position the bale handling apparatus 34 on the group 22 of bales (FIG. 4) while the group of bales is in the field. The boom 102 is connected to and steadies the bale handling apparatus 34 during operation of the flexible strip positioning apparatus 50 to form a continuous loop around the group 22 of bales.

After a continuous loop of the flexible strip 38 has been positioned around the group of bales in the manner previously explained, the boom 102 is raised to lift the bale handling apparatus 34 and group 22 of bales in a known manner. After the group of bales has been raised above the ground, the tractor 100 is operated to move the group of bales to a suitable storage location, such as a barn. After the group 22 of bales has been lowered to a desired position at the storage location, the bale handling apparatus 34 is operated to pivot the hooks 92 out of engagement with the bales 24 in the group 22 of bales.

Once the hooks 92 have been disengaged from the bales 24 in the group 22 of bales, the boom 102 is raised to raise the frame 56 of the bale handling apparatus upward off of the upper surface of the group 22 of bales. The tractor 100 is then moved away from the group of bales, that is, towards the left (as viewed in FIG. 9). After the tractor 100 and bale handling apparatus 34 have moved away from the group 22 of bales, a continuous loop 110 of the flexible strip 38 extends around and holds the group of bales, in the manner illustrated schematically in FIG. 10. The continuous loop 110 formed by the flexible strip holds the bales 24 against movement relative to each other to maintain bales 24 in a group at the storage location.

Bale Handling Apparatus

The bale handling apparatus 34 is operable to grip the bales 24 in a group 22 (FIG. 3) of bales when the bale handling apparatus 34 is disposed on top of the group 22 of bales in the manner illustrated schematically in FIG. 4. The bale handling apparatus 34 is utilized to grip the group 22 of bales in a field, hold the group 22 of bales while the continuous loop 110 (FIG. 10) of the flexible strip 38 is positioned around the group of bales, and to move the group of bales to a suitable storage location. The bale handling apparatus may be utilized with the tractor 100 or other suitable vehicle.

Since the group 22 of bales has a rectangular configuration, the bale handling apparatus 34 has a corresponding rectangular configuration. However, it should be understood that the group 22 of bales may have any desired configuration. Of course, the bale handling apparatus 34 may have a configuration which is at least somewhat similar to the configuration of the group 22 of bales 24. However, the bale handling apparatus 34 may have a configuration which is different than the configuration of the group 22 of bales 24.

The bale handling apparatus 34 may have any one of many known constructions, such as the construction disclosed in one or more of the following U.S. Pat. Nos. 2,734,646; 3,420,564; 3,876,093; 3,944,274; and 4,069,926. The specific bale handling apparatus 34 illustrated in FIGS. 1-9 may be referred to as a "grabber" and is commercially available from Kuhns Manufacturing having a place of business at 4210 Kinnsman Road, N.W., North Bloomfield, Ohio 44450. Of course, other known types of bale handling apparatus may be utilized if desired. For example, a clamp type bale handling apparatus which engages opposite sides of a group of bales may be utilized.

In the foregoing description, the group 22 of bales 24 have been disposed in a field and rest on the ground while the continuous loop 110 (FIG. 10) is formed around the group of bales. It is contemplated that the group of bales could be lifted off of the ground and the flexible strip positioning apparatus 50 utilized to form the continuous loop 110 while the group 22 of bales is supported above the ground by the bale handling apparatus 34. Rather than forming a continuous loop 110 around a group 22 of bales while the group of bales is in a field, the continuous loop 110 may be formed around a group of bales after the group of bales have been moved from a field.

In the embodiment of the invention illustrated in FIG. 9, the tractor 100 is utilized to move the bale handling apparatus 34 and group 22 of bales. However, it is contemplated that a telescopic handler may be utilized to move the bale handling apparatus 34 and group 22 of bales. For example, a "Bobcat Versahandler" (trademark) may be utilized to move the bale handling apparatus 34 and group 22 of bales.

The bale handling apparatus 34 grips the group 22 of bales while the continuous loop 110 of the flexible strip 38 is formed around the group of bales. As was previously mentioned, the group 22 of bales may be resting on a field or supported by a bale handling apparatus 34 above a field or other surface. The bale handling apparatus 34 provides a base for the flexible strip positioning apparatus 50 which forms the continuous loop 110 around the group of bales.

Flexible Strip Positioning Apparatus

The flexible strip positioning apparatus 50 is disposed on the bale handling apparatus 34 and is operable to position lengths of the flexible strip 38 along sides of the group 22 of bales. In the embodiment of the invention illustrated in FIGS. 1-10, a first length of the flexible strip is positioned adjacent to the rear or end section 54 of the bale handling apparatus 34 while the bale handling apparatus is spaced from the group 22 of bales (FIGS. 1 and 3). After the first length of the flexible strip 38 has been positioned adjacent to the rear end section 54 of the bale handling apparatus 34, the bale handling apparatus is moved into engagement with the group 22 of bales (FIG. 4).

The flexible strip positioning apparatus 50 is then operated to position lengths of the flexible strip 38 along three more sides of the rectangular group 22 of bales. Of course, if the group 22 of bales had a different configuration with either a greater or lesser number of sides, the flexible strip positioning apparatus would be operated to position lengths of the flexible strip along either a greater or lesser number of sides of the group of bales 24.

The flexible strip positioning apparatus 50 includes the support member or arm 30 which, in the illustrated embodiment of the invention, is pivotally mounted on the bale handling apparatus 34. To provide for pivotal mounting of the arm 30, a support structure 120 (FIG. 2) is provided at a central portion of the bale handling apparatus 34. The support member or arm 30 is pivotal about an axis which extends perpendicular to an upper side of a group 22 of bales when the bale handling apparatus 34 is disposed on the group of bales in the manner illustrated schematically in FIG. 4. Assuming that the group 22 of bales is disposed on a level support surface, the support member or arm 30 would be pivotal about a vertical axis which extends through a central portion of the group 22 of bales.

A reversible hydraulic motor 124 (FIG. 2) is mounted on the support structure 120 and is connected with an end portion of the support member or arm 30. The motor 124 is operable to rotate the arm 30 in either a clockwise or counterclockwise direction about a vertical (as viewed in FIG. 2) axis. Suitable valving and hydraulic lines (not shown) are associated with the motor 124 to effect operation of the motor to pivot the arm 30 in either the clockwise or counterclockwise direction.

A support section 130 (FIG. 2) extends downward from the arm 30 and supports the needle or positioning member 36. The support section 130 has a downward extent which is sufficient to position the positioning member or needle 36 below the bale handling apparatus 32. The length or downward extent of the support section 130 is sufficient to have the continuous loop 110 disposed approximately midway between upper and lower sides of the bales 22.

In addition to the positioning member or needle 36, a guide member 134 (FIG. 2) is mounted on the support section 130. The guide member 134 is resiliently deflectable under the influence of tension in the flexible strip 138 and positions the flexible strip relative to the positioning member 36 and support section 130. Suitable guide rings 140 are provided on the arm 30 to guide movement of the flexible strip along the arm. Guide rings 140 are also provided on the support section 130 and guide member 134 to guide movement of the flexible strip 38.

In addition, upstanding pins or posts 142 (FIG. 2) are provided adjacent to and forward of the hydraulic motor 124. The upstanding posts 142 engage flexible strip 38 and hold it away from the motor 124. The flexible strip 38 extends from the source 46 (FIG. 1), past the posts 142, to a guide ring 140 which is adjacent to the pivotally mounted, radially inner, end portion of the support member or arm 30 (FIG. 2). The length of the flexible strip 38 extending along the arm 30 is spaced from the arm by the guide rings 140.

As the arm 30 is pivoted in a counterclockwise direction from the position shown in FIG. 1 toward the position shown in FIG. 3, the arm moves toward the hook 76 in the slack take-up device 72. As the arm 30 moves through the position illustrated in FIG. 3, the flexible strip 38 approaches the hook 76 (FIG. 2). The hook 76 extends below the upper surface of the arm 30. Therefore, continued rotation of the arm 30 moves the arm into engagement with the hook 76.

Continued rotation of the arm 30 presses the arm against a sloping side portion of the hook 76. The hook 76 and arm 74 of the slack take-up device 72 are pivoted upward by engagement of the arm 30 with a sloping side or cam portion of the hook 76. As this occurs, resilient springs 148, on which the arm 74 of the slack take-up device is mounted, are deflected. This deflection of the springs 148 allows the slack take-up arm 74 to move upward (as viewed in FIG. 2) under the influence of force applied against the hook 76 by the support member or arm 30 of the flexible strip positioning apparatus 50. This ensures that the hook 76 will engage the flexible strip 38 as the flexible strip and support member or arm 30 continue to move in a counterclockwise direction about the radially inner end portion of the arm 30.

Although the slack take-up device 72 is effective to take up slack formed in the flexible strip 38 as the support member or arm 30 continues to pivot in a counterclockwise direction (as viewed in FIG. 2) past the arm 74 in the slack take-up device 72, the slack take-up device may be eliminated if desired. If this is done, the source 46 of the flexible strip 38 may apply tension to the flexible strip to take-up the slack at the source of the flexible strip. This may be done by applying a force against a spool or reel around which the flexible strip 38 is wound at the source 46 of the flexible strip. Of course, the slack which develops in the flexible strip 38 may be taken up in a different manner if desired. For example, a spring loaded array of pulleys may engage the flexible strip 38 to take up slack in the flexible strip.

During pivotal movement of the support arm 30, one end portion of the flexible strip 38 is gripped by the connector apparatus 42. As the positioning member 36 is moved away from the source 46 of the flexible strip 38 by pivotal movement of the support arm 30, the flexible strip is pulled from the source 46. The flexible strip 38 moves from the source 46 through the guides 140 (FIG. 2) to the opening in the end of the needle or positioning member 36. The flexible strip 38 is pulled through the opening in an outer end portion of the needle or positioning member 36 and is positioned relative to the bale handling apparatus 34 and the group 22 of bales 24.

Connector Apparatus

In the embodiment of the invention illustrated in FIGS. 1-10, the flexible strip 38 is a twine or string. The connector apparatus 42 interconnects end portions of the twine or string by forming a knot. The twine or string may be composed of two or more smaller strands or yarns twisted together. Natural fibers may be used to make the twine. These natural fibers may include cotton, sisal, jute, hemp, henequen, and/or coir. Alternatively, the twine may be formed of synthetic fibers or a combination of natural and synthetic fibers.

The connector apparatus 42 forms a knot in the flexible strip to interconnect end portions of the flexible strip. The connector apparatus 42 has a known construction which is similar to the construction of a Gear Driven Knotter which is commercially available from Deere & Company (John Deere) having a place of business at One John Deere Place, Molline, Ill. 61265. Alternatively, the connector apparatus 42 may have a construction similar to the construction disclosed in U.S. Pat. Nos. 3,400,959; 3,615,112; 3,712,654; 4,234,219; and/or 7,296,828. It should be understood that the twine knotter forming the connector apparatus 42 may have any one of many known constructions.

Rather than utilizing a string or twine to form the closed loop 110 about the group 22 of bales, it is contemplated that a band or strap may be provided around the group 22 of bales. This band or strap may be formed of metal or a polymeric material. Assuming that the flexible strip 38 is to be formed by a band or strap of polymeric material, it is contemplated that a thermoplastic band or strap may be utilized.

End portions of the thermoplastic band or strap may be interconnected with a welding and cutting mechanism similar to the one disclosed in U.S. Pat. No. 5,632,851. Of course, other known mechanisms may be utilized in the connector apparatus 42 to cut and interconnect end portions of a strip formed by a band or strap of thermoplastic material. Rather than welding (bonding) portions of the strap together, as disclosed in U.S. Pat. No. 5,632,851, a separate connector may be provided.

It is contemplated that the flexible strip 38 may be formed of many different materials. As was previously mentioned, the flexible strip 38 may be a string or twine formed of natural or synthetic materials. Alternatively, the flexible strip 38 may be formed of metal.

For example, the flexible strip may be formed of metal wire. End portions of the wire may be twisted together to form the continuous loop 110. If desired, an apparatus similar to the apparatus disclosed in U.S. Pat. No. 5,870,950 may be used to twist the wire.

If the flexible strip 38 is formed by a metal wire or band, the metal wire or band may have a polymeric sheath or jacket. If a metal wire, strap, and/or band is used to form the continuous loop 110, a mechanical fastener may be utilized to connect end portions of the flexible strip to form the continuous loop 110.

Figure 11:
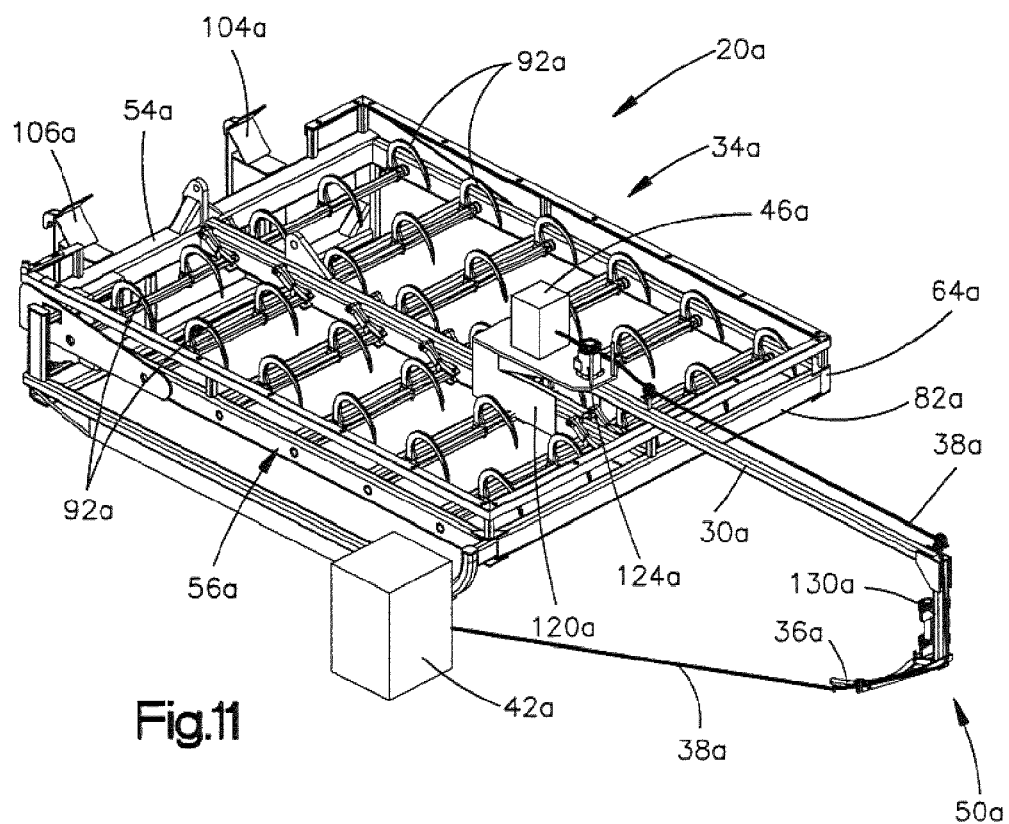
FIG. 11 is a schematic pictorial illustration of a second embodiment of the invention.

Embodiment of FIG. 11

In the embodiment of the invention illustrated in FIGS. 1-9, the support arm 30 of the flexible strip positioning apparatus 50 has been pivotally mounted at a central portion at the bale handing apparatus. In the embodiment of the invention illustrated in FIG. 11, the support arm of the flexible strip positioning apparatus is mounted adjacent to a forward or front end portion of the bale handing apparatus. Since the embodiment of the invention illustrated in FIG. 11 is generally similar to the embodiment of the invention illustrated in FIGS. 1-10, similar numerals will be utilized to designate similar components, the suffix letter "a" being associated with the numerals of FIG. 11 to avoid confusion.

An apparatus 20a for use with a group of bales, corresponding to the group 22 of bales 24 of FIG. 1, includes a bale handling apparatus 34a (FIG. 11). The bale handling apparatus 34a includes a frame 56a on which a plurality of hooks 92a are pivotally mounted. The handling apparatus 34a includes a rear or end section 54a having connectors 104a and 106a which are engagable by a suitable vehicle, such as the tractor 100 of FIG. 9.

In accordance with a feature of the embodiment of the invention illustrated in FIG. 11, a flexible strip positioning apparatus 50a is disposed adjacent to a front end portion 82a of the bale handling apparatus 34a. The flexible strip positioning apparatus includes a support member or arm 30a which is pivotally mounted on the bale handling apparatus 34a. A positioning member or needle 36a is supported on an outer end portion of the arm 30a and engages a flexible strip 38a.

A source 46a of the flexible strip 38a is disposed on a support structure 120a mounted on a forward portion of the bale handling apparatus 34a. A reversible hydraulic motor 124a is mounted on the support structure 120a. The reversible hydraulic motor 124a is operable to pivot the support member or arm 30a in the flexible strip positioning apparatus 50a relative to the bale handling apparatus 34a.

The flexible strip 38a extends from the source 46a along the support member or arm 30a. The flexible strip extends down a support section 130a and through an opening in the positioning member or needle 36a. A free end of the flexible strip 38a is held by a connector apparatus 42a.

The flexible strip 38a may be a twine, string, cord, or rope formed of a synthetic and/or natural material. The flexible strip 38a may be a band or strap having a generally rectangular cross sectional configuration as viewed in a plane extending perpendicular to a longitudinal axis of the flexible strip. A band or strap forming the flexible strip 38a may be formed of either metal or a polymeric material. The flexible strip 38a may be formed with a metal core which is enclosed by a plastic sheath or coating.

Figure 10:
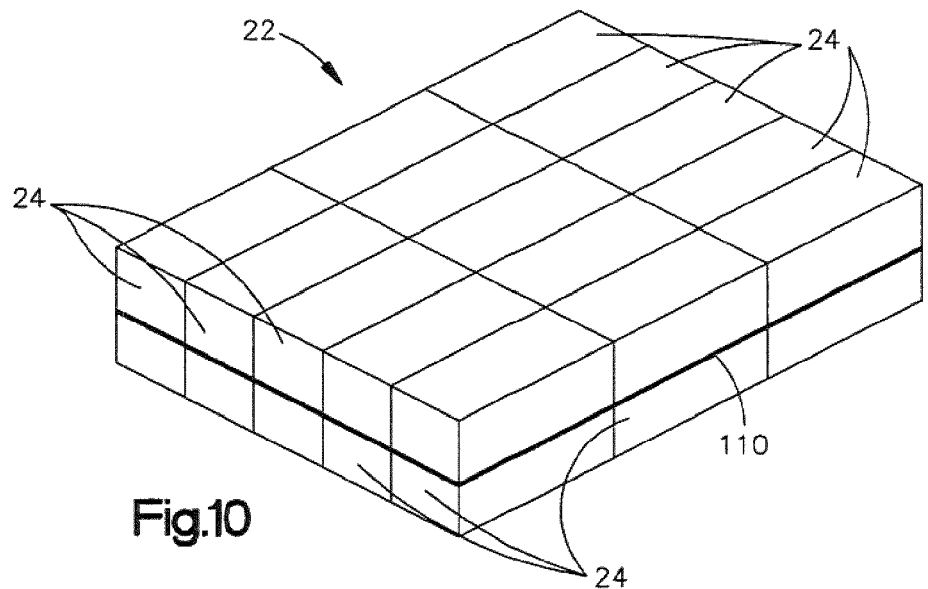
FIG. 10 is a schematic illustration, similar to FIG. 1, depicting the manner in which the flexible strip forms a closed loop which extends around a group of bales, the bale handling apparatus having been disengaged from the group of bales.

The connector apparatus 42a is effective to cut the flexible strip 38a and to interconnect end portions of the flexible strip 38a so as to form a continuous loop, similar to the continuous loop 110 of FIG. 10. The connector apparatus 42a may interconnect end portions of the flexible strip 38a by forming a knot interconnecting the two end portions of the flexible strip, by bonding the end portions of the flexible strip to each other, and/or by utilizing a mechanical connector to interconnect the end portions of the flexible strip.

When the apparatus 20a is to be utilized to form a continuous loop, corresponding to the continuous loop 110 of FIG. 10, around a group 22 of bales, the arm 30a is moved from a position in which the positioning member 36a is disposed in the connector apparatus 42a to a position in which the positioning member 36a is offset to the opposite side of the bale handling apparatus 34a. This positions the flexible strip 38a to extend across the front end portion 82a of the bale handling apparatus 34a while the bale handling apparatus is spaced from a group 22 of bales. To accomplish this, the motor 124a is operated to pivot the arm 30a in a counterclockwise direction (as viewed in FIG. 11).

When the positioning member 36a has moved adjacent to a left front corner portion 64a of the bale handling apparatus 34a, operation of the motor 124a and pivotal movement of the arm 30a is interrupted. At this time, the flexible strip 38a will extend along the front portion 82a of the bale handling apparatus at a location which is offset downward (as viewed in FIG. 11) from the bale handling apparatus.

A vehicle, similar to the tractor 100 of FIG. 9, engages the connectors 104a and 106a. The vehicle is then operated to align the bale handling apparatus 34a with a group of bales, similar to the group 22 of bales illustrated in FIGS. 2 and 3. The vehicle is then operated to move the bale handling apparatus 34a toward the group 22 of bales.

As the bale handling apparatus 34 moves toward the group 22 of bales, the portion of the flexible strip 38a extending across the front portion 82a of the bale handling apparatus 34a moves into engagement with the group 22 of bales. At this time, the side section 86a is disposed in engagement with one side of the group 22 of bales and the frame 56a is slightly above the group of bales. Continued movement of the bale handling apparatus 34a to a location above the group 22 of bales results in lengths of the flexible strip 38a being positioned along three of the four sides of the group 22 of bales.

As the bale handling apparatus 341 is moved toward a group 22 of bales 24, the portion of the flexible strip 38a extending across the front or leading end portion of the bale handling apparatus moves into engagement with the closest side of the group of bales. Continued movement of the bale handling apparatus 34a toward the group of bales presses the flexible strip 38a against the closest side of the group of bales and tensions the flexible strip. As this occurs, the flexible strip is pulled from the source 46a and moves along the positioning arm 30a to the opening at the end portion of the positioning member 36a. The flexible strip 138a is pulled into a generally U-shaped configuration by engagement with the group 22 of bales. As this occurs, one leg of the U-shaped portion of the flexible strip 138a is positioned along the side of the group 22 of bales engaged by the side section 86a of the bale handling apparatus 34a. The other leg of the U-shaped portion of the flexible strip 138a is positioned along the opposite side of the group 22 of bales.

When the bale handling apparatus has moved to a position over the group 22 of bales, the bale handling apparatus 34a is lowered so that the frame 56a rests on top of the group 22 of bales. The bale handling apparatus 34a is then operated to move the hooks 92a into engagement with the bales 24 to securely interconnect the bales 24 and the bale handling apparatus 34a. At this time, the bale handling apparatus 34a will be resting on top of the group of bales in the manner illustrated schematically in FIG. 4 for the bale handling apparatus 34.

While the bale handling apparatus 34a is resting on top of and gripping the group of bales, the motor 124a is operated to pivot the arm 30a in a clockwise direction relative to the bale handling apparatus. This results in movement of the positioning member or needle 36 from a position adjacent to the left front corner portion 64a of the bale handling apparatus 34a into the connector apparatus 42a. As this occurs, the flexible strip 38a is tensioned. The connector apparatus 42a then cuts the flexible strip 38a and interconnects end portions of the flexible strip. Assuming that the flexible strip is a string, such as binder twine, the connector apparatus 42*a* then forms a knot in the end portions of the flexible strip 38*a*. This forms a continuous loop, similar to the continuous loop 110 of FIG. 10. As was previously mentioned, the end portions of the flexible strip may be interconnected in a manner other than by forming a knot.

Although the flexible strip positioning apparatus 50*a* has been illustrated in FIG. 11 as being mounted on the bale handling apparatus 34*a* at a location adjacent to the front end portion 82*a* of the bale handling apparatus, it is contemplated that the flexible strip positioning apparatus could be mounted in a different location on the bale handling apparatus 34*a* if desired. For example, the flexible strip positioning apparatus 50*a* may be mounted adjacent to the rear end portion 54*a* of the bale handling apparatus 34*a*.

Conclusion

In view of the foregoing description, it is apparent that the present invention provides a new and improved method and apparatus 20 for use with a group 22 of bales. The group 22 of bales is gripped with a bale handling apparatus 34. A flexible strip 38 is positioned around the group 22 of bales. The group 22 of bales is moved while it is gripped by the bale handling apparatus 34 and while the flexible strip 38 extends around the group of bales.

To position the flexible strip 38 around the group 22 of bales, a positioning member 36 may advantageously be moved relative to the bale handling apparatus 34 while the positioning member is in engagement with the flexible strip 38 and while the bale handling apparatus is in engagement with the group 22 of bales. The flexible strip 38 may be formed into a closed loop 110 which extends around the group of bales by interconnecting portions of the flexible strip.

The present invention has a plurality of different features. These features may be utilized in combination with each other in the manner disclosed herein. Alternatively, the features may be used separately and/or in combination with features of known devices.

Having described the invention, the following is claimed:

1. A method of handling a plurality of bales, said method comprising the steps of positioning the bales in a group, gripping the group of bales with a bale handling apparatus, positioning a flexible strip around the group of bales, and moving the group of bales while the group of bales is gripped by the bale handling apparatus and while the flexible strip extends around the group of bales, said steps of gripping the group of bales and positioning the flexible strip around the group of bales include moving the bale handling apparatus from a first location spaced from the group of bales to a second location in which the bale handling apparatus engages at least a portion of the group of bales and moving at least a first portion of the flexible strip of material along with the bale handling apparatus from a location in which the first portion of the flexible strip of material is spaced from the group of bales to a location in which the first portion of the flexible strip of material is disposed in engagement with at least a first side of the group of bales as the bale handling apparatus moves from the first location to the second location.

2. A method as set forth in claim 1 wherein said step of positioning the flexible strip of material around the group of bales includes moving a second portion of flexible strip of material into engagement with at least second and third sides of the group of bales while the bale handling apparatus engages at least a portion of the group of bales.

3. A method as set forth in claim 1 wherein said step of positioning the flexible strip of material around the group of bales includes forming a closed loop which extends around the group of bales by interconnecting the portions of the flexible strip of material while the bale handling apparatus is in the second location in which the bale handling apparatus engages at least a portion of the group of bales.

4. A method as set forth in claim 3 wherein said step of interconnecting portions of the flexible strip of material includes forming a knot which interconnects portions of the flexible strip of material.

5. A method as set forth in claim 1 wherein said step of gripping the group of bales with a bale handling apparatus includes moving the bale handling apparatus into engagement with an upper side of the group of bales, said step of positioning the flexible strip around the group of bales includes forming a closed loop which extends around the group of bales at a location between upper and lower sides of the group of bales while the bale handling apparatus is disposed in engagement with the upper side of the group of bales.

6. A method as set forth in claim 1 wherein said step of positioning a flexible strip around the group of bales includes pivoting a positioning arm connected with the flexible strip about an axis which extends through the bale handling apparatus and through the group of bales.

7. A method as set forth in claim 6 wherein said step of positioning a flexible strip around the group of bales includes moving a positioning element which is connected with the positioning arm and which engages the flexible strip along at least one side of the group of bales with a portion of the flexible strip which is engaged by the positioning element disposed below an upper side of the group of bales.

8. A method as set forth in claim 7 wherein said step of moving the positioning element along at least one side of the group of bales includes sliding a portion of the flexible strip through an opening formed in a portion of the positioning element.

9. A method as set forth in claim 1 wherein said step of gripping the group of bales with a bale handling apparatus includes positioning a base on an upper side of the group of bales and moving a plurality of hooks through the upper side of the group of bales and into the bales.

10. A method as set forth in claim 9 wherein said steps of gripping the group of bales and positioning a flexible strip around the group of bales includes moving a portion of the flexible strip into engagement with at least one side of the group of bales during performance of said step of positioning a base on the upper side of the group of bales.

11. A method as set forth in claim 9 wherein said steps of gripping the group of bales and positioning a flexible strip around the group of bales includes moving a portion of the flexible strip into engagement with at least three sides of the group of bales during performance of said step of positioning a base on the upper side of the group of bales.

12. A method as set forth in claim 1 wherein said step of gripping the group of bales includes moving the bale handling apparatus into engagement with the group of bales, said step of positioning the flexible strip around the group of bales includes moving the flexible strip into engagement with a plurality of sides of the group of bales by moving a positioning member relative to the bale handling apparatus while the positioning member is disposed in engagement with the flexible strip and while the bale handling apparatus is in engagement with the group of bales, and forming a closed loop which extends around the group of bales by interconnecting portions of the flexible strip.

13. A method as set forth in claim 12 wherein said step of moving the positioning member relative to the bale handling apparatus includes pivoting a support member connected with the positioning member relative to the bale handling apparatus with the support member disposed above the bale handling apparatus.

14. A method as set forth in claim 12 wherein said step of moving the bale handling apparatus into engagement with the group of bales includes moving the bale handling apparatus into engagement with an upper side of the group of bales, said step of moving the flexible strip into engagement with a plurality of sides of the group of bales includes engaging the plurality of sides of the group of bales with the flexible strip at locations which are disposed downward from the upper side of the group of bales.

15. A method as set forth in claim 12 wherein said step of moving the flexible strip into engagement with a plurality of sides of the group of bales by moving a positioning member relative to the bale handling apparatus includes removing slack formed in the flexible strip as the flexible strip is moved into engagement with at least one of the sides of the group of bales.

16. A method as set forth in claim 12 wherein said step of forming a closed loop including forming a knot in the flexible strip.

17. A method of handling a plurality of bales, said method comprising the steps of positioning the bales in a group, gripping the group of bales with a bale handling apparatus, positioning a flexible strip around the group of bales, and moving the group of bales while the group of bales is gripped by the bale handling apparatus and while the flexible strip extends around the group of bales, said step of positioning the bales in a group includes positioning the bales in a generally rectangular group, said step of gripping the bales with a bale handling apparatus includes gripping the rectangular group of bales with a bale handling apparatus having a generally rectangular configuration, said bale handling apparatus having a first edge portion which extends between first and second corner portions of the bale handling apparatus and a second edge portion which is parallel to said first edge portion and extends between third and fourth corner portions of the bale handling apparatus, said step of positioning a flexible strip around the group of bales includes moving a positioning member which engages a flexible strip in a first direction relative to the bale handling apparatus while the bale handling apparatus is spaced from the group of bales, said step of moving the positioning member relative to the bale handling apparatus includes moving the positioning member in the first direction from a position adjacent to the first corner portion of the bale handling apparatus to a position adjacent to the second corner portion of the bale handling apparatus and positioning a first length of the flexible strip to extend along the first edge portion of the bale handling apparatus, thereafter, moving the bale handling apparatus toward the group of bales with the second edge portion of the bale handling apparatus leading and the first edge portion of the bale handling apparatus trailing, positioning the bale handling apparatus on top of the group of bales with the first length of the flexible strip extending along a first side of the group of bales, moving the positioning member in a second direction relative to the bale handling apparatus while the bale handling apparatus is on top of the group of bales and while the positioning member is in engagement with the flexible strip, said step of moving the positioning in the second direction relative to the bale handling apparatus includes moving the positioning member from a position adjacent to the second corner portion of the bale handling apparatus to a position adjacent to the first corner portion of the bale handling apparatus, said step of moving the positioning member from the position adjacent to the second corner portion of the bale handling apparatus to the position adjacent to the first corner portion of the bale handling apparatus includes positioning a second length of the flexible strip along a second side of the group of bales, positioning a third length of the flexible strip along a third side of the group of bales, and positioning a fourth length of the flexible strip along a fourth side of the group of bales, and, thereafter, connecting the fourth length of the flexible strip with the first length of the flexible strip to form a closed loop which extends around the group of bales.

18. A method as set forth in claim 17 wherein said step of moving the positioning member in the first direction relative to the bale handling apparatus includes moving the positioning member in the first direction from the position adjacent to the first corner portion of the bale handling apparatus along a path which extends from the location adjacent to the first corner portion of the bale handling apparatus past the third and fourth corner portions of the bale handling apparatus to the position adjacent to the second corner portion of the bale handling apparatus, said step of moving the positioning member in the second direction relative to the bale handling apparatus includes moving the positioning member in the second direction from the position adjacent to the second corner portion of the bale handling apparatus along a path which extends from the location adjacent to the second corner portion of the bale handling apparatus past the fourth and third corner portions of the bale handling apparatus to the position adjacent to the first corner portion of the bale handling apparatus, said step of connecting the fourth length, of the flexible strip with the first length of the flexible strip to form a loop being performed with the positioning member adjacent to the first corner portion of the bale handling apparatus.

19. A method as set forth in claim 17 wherein said step of moving the positioning member in the first direction relative to the bale handling apparatus includes pivoting an arm connected with the positioning member in the first direction, said step of moving the positioning member in the second direction relative to the bale handling apparatus includes pivoting the arm connected with the positioning member in the second direction.

20. A method as set forth in claim 17 wherein said step of moving the positioning member in the first direction relative to the bale handling apparatus includes forming slack in the flexible strip, said method further includes taking up slack formed in the flexible strip as the positioning member moves in the first direction relative to the bale handling apparatus.

21. A method as set forth in claim 17 wherein said step of moving the positioning member in the first direction is performed with the flexible strip disposed in engagement with the positioning member.

22. A method as set forth in claim 17 wherein said step of moving the group of bales includes moving the group of bales while the group of bales is gripped by the bale handling apparatus and while the closed loop extends around the group of bales.

23. A method as set forth in claim 17 wherein said step of moving the bale handling apparatus toward the group of bales and positioning the bale handling apparatus on top of the group of bales includes engaging the first side of the group of bales with the first length of the flexible strip.

24. A method as set forth in claim 17 wherein said step of connecting the fourth length of the flexible strip with the first length of the flexible strip to form a closed loop includes forming a knot interconnecting the first and fourth lengths of the flexible strip.

25. A method as set forth in claim 17 wherein said steps of moving the positioning member in a first direction and moving the positioning member in a second direction include moving the positioning member in opposite directions along an arcuate path having a center of curvature disposed on an axis which extends through the bale handling apparatus.

26. A method as set forth in claim 17 further including the step of moving a plurality of hooks in the bale handling apparatus into engagement with bales in the group of bales while the bale handling apparatus is disposed on top of the group of bales.

27. A method of handling a plurality of bales, said method comprising the steps of positioning the bales in a group, gripping the group of bales with a bale handling apparatus which is at least partially disposed on an upper side of the group of bales, positioning a flexible strip around the group of bales while the bale handling apparatus is at least partially disposed on the upper side of the group of bales and is gripping the group of bales, and moving the group of bales while the group of bales is gripped by the bale handling apparatus which is at least partially disposed on the upper side of the group of bales and while the flexible strip extends around the group of bales.

28. A method as set forth in claim 27 wherein said steps of gripping the group of bales and positioning the flexible strip around the group of bales include moving the bale handling apparatus from a first location spaced from the group of bales to a second location in which the bale handling apparatus engages the upper side of the group of bales and moving at least a first portion of the flexible strip of material along with the bale handling apparatus from a location in which the first portion of the flexible strip of material is spaced from the group of bales to a location in which the first portion of the flexible strip of material is disposed in engagement with at least a first side of the group of bales as the bale handling apparatus moves from the first location to the second location.

29. A method as set forth in claim 28 wherein said step of positioning the flexible strip of material around the group of bales includes moving a second portion of flexible strip of material into engagement with at least second and third sides of the group of bales while the bale handling apparatus engages the upper side of the group of bales.

30. A method as set forth in claim 27 wherein said step of positioning the flexible strip of material around the group of bales includes forming a closed loop which extends around the group of bales at a location between upper and lower sides of the group of bales by interconnecting portions of the flexible strip of material while the bale handling apparatus is at least partially disposed on the upper side of the group of bales and is gripping the group of bales.

31. A method as set forth in claims 30 wherein said step of interconnecting portions of the flexible strip of material includes forming a knot which interconnects portions of the flexible strip of material.

32. A method as set forth in claim 27 wherein said step of positioning a flexible strip around the group of bales includes pivoting a positioning arm connected with the flexible strip about an axis which extends through the bale handling apparatus and through the group of bales while the bale handling apparatus engages the upper side of the group of bales and is gripping the group of bales.

33. A method as set forth in claim 27 wherein said step of gripping the group of bales with a bale handling apparatus includes moving a plurality of hooks through the upper side of the group of bales and into the bales.

34. A method as set forth in claim 33 wherein said step of gripping the group of bales includes positioning a base on the upper side of the group of bales, said step of moving a plurality of hooks includes moving the hooks relative to the base, said step of positioning a flexible strip around the group of bales includes moving a portion of the flexible strip into engagement with at least one side of the group of bales during performance of said step of positioning a base on the upper side of the group of bales.

35. A method as set forth in claim 27 wherein said steps of gripping the group of bales and positioning a flexible strip around the group of bales includes positioning the bale handling apparatus on an upper side of the group of bales and moving a portion of the flexible strip into engagement with at least three sides of the group of bales during performance of said step of positioning the bale handling apparatus on the upper side of the group of bales.

36. A method as set forth in claim 27 wherein said step of positioning the flexible strip around the group of bales includes moving the flexible strip into engagement with a plurality of sides of the group of bales by moving a positioning member relative to the bale handling apparatus while the positioning member is disposed in engagement with the upper side of the flexible strip and while the bale handling apparatus is in engagement with the group of bales, and forming a closed loop which extends around the group of bales by interconnecting portions of the flexible strip.

37. A method as set forth in claim 36 wherein said step of moving the positioning member relative to the bale handling apparatus includes pivoting a support member connected with the positioning member about an axis which extends through the bale handling apparatus with the support member disposed above the bale handling apparatus.

38. A method as set forth in claim 27 wherein said step of positioning a flexible strip around the group of bales includes moving the flexible strip into engagement with at least one side of the group of bales at a location which is disposed downward from the upper side of the group of bales while the bale handling apparatus is disposed on the upper side of the group of bales.

39. A method as set forth in claim 38 wherein said step of moving the flexible strip into engagement with at least one side of the group of bales includes pivoting a positioning member relative to the bale handling apparatus about an axis which extends through the bale handling apparatus and removing slack formed in the flexible strip as the flexible strip is moved into engagement with at least one side of the group of bales.

40. A method as set forth in claim 27 wherein said step of positioning the flexible strip around the group of bales includes the steps of positioning a first length of a flexible strip along a first side of a bale handling apparatus while the bale handling apparatus is spaced from the group of bales, moving the bale handling apparatus into engagement with the upper side of the group of bales, said step of moving the bale handling apparatus into engagement with the upper side of the group of bales includes positioning the first length of the flexible strip along a first side of the group of bales, positioning a second length of the flexible strip along at least a second side of the group of bales while the bale handling apparatus is disposed is engagement with the upper side of the group of bales, and forming at least a portion of the flexible strip into a closed loop which extends around the group of bales, said step of forming the flexible strip into a closed loop in a performed while the bale handling apparatus is disposed in engagement with the upper side of the group of bales and includes interconnecting portions of the flexible strip.

41. A method as set forth in claim 40 wherein said step of positioning the first length of the flexible strip along a first side of the group of bales includes moving a positioning member which engages the flexible strip in a first direction relative to the bale handling apparatus, said step of positioning the second length of the flexible strip along a second side of the group of bales includes moving the positioning member in a second direction relative to the bale handling apparatus while the positioning member is in engagement with the flexible strip, said second direction being opposite to said first direction.

42. A method as set forth in claim 41 wherein said step of moving the positioning member in the first direction includes pivoting a support arm connected with the positioning member in the first direction about an axis which extends through the bale handling apparatus, said step of moving the positioning member in the second direction includes pivoting the support arm in the second direction about an axis which extends through the bale handling apparatus.

43. A method as set forth in claim 42 wherein said step of pivoting the support arm in the first direction includes forming slack in the flexible strip and taking up the slack formed in the flexible strip.

44. A method as set forth in claim 43 wherein said step of taking up the slack formed in the flexible strip includes engaging the flexible strip with a hook.

45. A method as set forth in claim 42 wherein said step of pivoting the support arm in the first direction relative to the bale handling apparatus includes pivoting the support arm about an axis which extends through a central portion of the bale handling apparatus with the support arm disposed above the bale handling apparatus.

46. A method as set forth in claim 42 wherein said step pivoting the support arm in the first direction relative to the bale handling apparatus includes moving the positioning member from a location disposed adjacent to a first end of a first edge portion of the bale handling apparatus to a position adjacent to a second end of the first edge portion of the bale handling apparatus along a path which extends past a second edge portion of the bale handling apparatus, said step of moving the bale handling apparatus into engagement with the group of bales being performed with the second edge portion of the bale handling apparatus leading and the first edge portion of the bale handling apparatus trailing.

47. A method as set forth in claim 27 wherein said step of gripping the group of bales with the bale handling apparatus includes moving the bale handling apparatus into engagement with the upper side of the group of bales includes positioning the bale handling apparatus on top of the group of bales and engaging the group of bales with a plurality of hooks which form part of the bale handling apparatus.

48. A method as set forth in claim 47 further including the steps of moving the group of bales while the group of bales is engaged by the plurality of hooks and while the closed loop formed by the flexible strip extends around the group of bales.

* * * * *